Patented Dec. 19, 1950

2,534,283

UNITED STATES PATENT OFFICE 2,534,283

ACID INITIATION OF AMINO ACID N-CARBOANHYDRIDE CONDENSATION

Robert Neal MacDonald, New Castle, Del., assignor to E. I. du Pont de Nemours & Company, Wilmington, Del., a corporation of Delaware No Drawing. Application October 4, 1947, Serial No. 778,032

7 Claims. (Cl. 260—78)

This invention relates to synthetic linear polyamides, and, more particularly, to an improved method for preparing linear polyamides from amino acid N-carboanhydrides.

This invention has as an object the preparation, from N-carboanhydrides of amino acids, of polymers of amino acids. A further object is the provision of an improved process for the preparation of high-molecular-weight amino acid polymers. Other objects will appear hereinafter.

These objects are accomplished by the following invention, wherein the condensation polymerization of amino acid N-carboanhydrides is conducted using, as the initiator, from 1.2 to 0.00075 mole per cent, based on the total N-carboanhydrides employed, of acids having an ionization constant at 25° C. in the range $2.25 \times 10^{-3}$ to $6 \times 10^{-7}$, i. e., for each mole of amino acid N-carboanhydride 0.012 to 0.0000075 mole of acid is used. The initiatory action of such small amounts of acids is evident in both solution and bulk polymerizations.

The N-carboanhydrides used in this invention may be prepared by the method of Leuchs, Ber. 39, 857–861 (1906) or, as disclosed in greater detail in my copending application Serial No. 778,458 filed October 7, 1947 and now abandoned, by the reaction of phosgene with the amino acid or its alkali or alkaline earth metal salts under anhydrous conditions.

The following examples in which parts are by weight are further illustrative of the invention. The chloroform used in the processes of the examples was stored over calcium chloride for one month and freshly redistilled just prior to use.

Example I

To a solution of 3 parts of the N-carboanhydride of 2-amino-4,6,6-trimethylheptanoic acid in 223.35 parts of chloroform was added 0.03 parts (1.16 mole per cent based on N-carboanhydride) of 1-phenylethylenephosphonic acid whose ionization constant, $K_1$ at 25° C.$=2.25 \times 10^{-3}$ as determined experimentally. The solution was allowed to stand in a closed container at room temperature for one day. At the end of this time, appreciable pressure was noted in the system when it was opened to the atmosphere. A thin layer of the solution was poured on a glass plate and the solvent evaporated. There was obtained a clear, tough, transparent, colorless film which exhibited marked adherence to the glass plate.

A similar solution of another sample from the same batch of N-carboanhydride containing no added 1-phenylethylenephosphonic acid, after standing for one day in a closed vessel at room temperature, exhibited no pressure when the system was opened to the atmosphere. Upon evaporating the solvent from a thin layer of the solution on a glass plate, there was obtained crystalline N-carboanhydride. Thus, initiatory action was observed when the small proportion of 1-phenylethylenephosphonic acid was added.

Example II

To a solution of one part of the N-carboanhydride of 2-amino-4,6,6-trimethylheptanoic acid in 74.45 parts of chloroform was added 0.007 part (0.89 mole per cent based on N-carboanhydride) of p-nitrobenzoic acid, whose ionization constant $K_1 = 3.76 \times 10^{-4}$ at 25° C. After standing for one day in a closed container at room temperature, moderate pressure was noted when the system was opened to the atmosphere. A thin layer of the solution was poured on a glass plate and the solvent was evaporated. There was obtained a film containing some crystalline material.

After standing for two days in a closed container at room temperature, the above solution exhibited moderate pressure when the system was opened to the atmosphere. A thin layer of the solution was poured onto a glass plate and the solvent evaporated. There was obtained a clear, self-supporting, flexible film.

A similar solution of another sample from the same batch of N-carboanhydride without added p-nitrobenzoic acid, after standing for one day in a closed vessel at room temperature, gave only crystalline starting material upon evaporation at room temperature of the chloroform from a thin layer of the solution flowed onto a glass plate. After standing for two days under like conditions, the solution developed very slight pressure. When a thin layer of the solution was poured on a glass plate and the solvent evaporated, there was obtained a partially clear, partially opaque, brittle, weak film. Thus, the initiatory action of the small proportion of p-nitrobenzoic acid is well demonstrated by the superior film properties obtained when it is employed as compared with the film properties of the polymer obtained without employing p-nitrobenzoic acid.

Example III

A mixture of ten parts of the N-carboanhydride of alpha-aminoisobutyric acid, five parts of the N-carboanhydride of 1-aminocyclohexanecarboxylic acid, and 0.01 parts (0.064 mole per cent based on the total N-carboanhydrides charged) of adipic acid, whose ionization constant $K_i = 3.72 \times 10^{-5}$ at 25° C., was placed in a glass tube. The contents of the tube were then heated at atmospheric pressure, i. e., with one end of the tube open, under nitrogen at 146° C. A clear melt was obtained and polymerization began at once, as indicated by bubbles of carbon dioxide rising through the liquid melt. Within twenty minutes a white, solid copolymer of alpha-aminoisobutyric acid and 1-aminocyclohexanecarboxylic acid was obtained in quantitative yield. The copolymer was soluble in m-cresol, chloroform, and cyclohexanone, and did not fuse below 330° C.

Under like conditions, three to four hours' heating time was required to produce a similar copolymer from another sample of this same mixture, made up from the same batch of N-carboanhydrides, without the added adipic acid, and the rate of evolution of carbon dioxide was appreciably less than in the foregoing example with the added initiator. Thus, the initiatory action of the small proportion of adipic acid is well demonstrated by the marked decrease in the heating time, necessary for complete polymerization, as well as the appreciable increase in the rate of carbon dioxide evolution when the adipic acid is present.

*Example IV*

To a solution of one part of the N-carboanhydride of 2-amino-4,6,6-trimethylheptanoic acid in 74.45 parts of chloroform was added 7.445 parts of a chloroform solution containing 0.0028 part (0.99 mole per cent based on N-carboanhydride) of acetic acid, whose ionization constant $K_i$ at 25° C. $= 1.753 \times 10^{-5}$. After standing for one day in a closed container at room temperature, appreciable pressure was noted when the system was opened to the atmosphere. A thin layer of the solution was flowed onto a glass plate and the solvent evaporated. There was obtained a clear, flexible, transparent, tough film.

A similar solution of another sample from the same batch of N-carboanhydride without added acetic acid developed no pressure upon standing for fifteen hours in a closed vessel at room temperature, and failed to give a coherent film upon evaporating the solvent from a thin layer of the solution flowed on a glass plate (only crystalline starting N-carboanhydride was obtained). Thus, the initiatory action of the small proportion of acetic acid is well demonstrated through the superior film properties obtained when it is employed as compared with the film properties of the polymer obtained without employing acetic acid.

*Example V*

To a solution of 3 parts of the N-carboanhydride of 2-amino-4,6,6-trimethylheptanoic acid in 223.35 parts of chloroform was added 0.048 part (1.20 mole per cent based on N-carboanhydride) of stearic acid, whose ionization constant $K_i$ at 35° C. $= 1.7 \times 10^{-6}$, as reported in C. A. 34, 2678 (1940). After standing for one day in a closed container at room temperature, appreciable pressure was noted when the system was opened to the atmosphere. A thin layer of the solution was flowed onto a glass plate and the solvent evaporated. There was obtained a clear film which when stripped from the plate was self-supporting.

A similar solution of another sample from the same batch of N-carboanhydride containing no added stearic acid initiator developed no pressure upon standing for fifteen hours in a closed vessel at room temperature and failed to give a coherent film upon evaporating the solvent from a thin layer of the solution flowed onto a glass plate (only crystalline starting material was obtained). Thus, the initiatory action of the small proportion of stearic acid is well demonstrated by the superior film properties obtained when it is employed.

*Example VI*

To a solution of one part of the N-carboanhydride of 2-amino-4,6,6-trimethylheptanoic acid in 74.45 parts of chloroform was added 1.489 parts of a chloroform solution containing 0.00001 part (0.00075 mole per cent based on N-carboanhydride) of stearic acid. After standing for one day in a closed container at room temperature, no pressure was noted when the system was opened to the atmosphere. A thin layer of the solution was poured onto a glass plate and the solvent was evaporated. There was obtained only crystalline starting material.

After standing for two days in a closed container at room temperature, the above solution exhibited moderate pressure when the system was opened to the atmosphere. A thin layer of the solution was poured onto a glass plate and the solvent evaporated. There was obtained a clear, flexible, fairly tough, and coherent film, much better in film properties than the control film described below.

A similar solution of another sample from the same batch of N-carboanhydride without added stearic acid gave the same result as the solution containing the stearic acid after standing for one day in a closed vessel at room temperature. After standing for two days under similar conditions, this solution developed slight pressure and gave a partly clear, partly opaque, brittle, weak film upon evaporation of the solvent from a thin layer of the solution poured onto a glass plate. Thus, the initiatory action of the small proportion of stearic acid is well demonstrated by the superior film properties obtained when it is employed as compared with the film properties of the polymer obtained without employing stearic acid.

*Example VII*

A mixture of 2 parts of the N-carboanhydride of 1-aminocyclohexanecarboxylic acid and 0.016 part (0.69 mole per cent based on N-carboanhydride) of telluric acid ($H_2TeO_4$), whose ionization constant $K_i = 6 \times 10^{-7}$ at 25° C., was heated at atmospheric pressure under nitrogen at 146° C. The N-carboanhydride gave a clear melt with insoluble telluric acid particles in the bottom, from which bubbles of carbon dioxide could be seen rising within two minutes. After three minutes, the liquid became opaque and carbon dioxide evolution was markedly increased. Within four minutes appreciable foaming and an increase in melt viscosity was noted, and within six minutes solid polymer was obtained.

Under like conditions another sample from the same batch of N-carboanhydride, without the added initiator, became slightly hazy after twelve minutes but was still a fluid, opaque liquid after eight hours' heating. Evolution of carbon dioxide was appreciably less rapid than in the above case where added initiator was present. Thus, the initiatory action of the small proportion of telluric acid is well demonstrated by the marked decrease in the heating time, necessary for complete polymerization, as well as the appreciable increase in the rate of carbon dioxide evolution when the telluric acid is present.

In the process of this invention there may be employed, singly or in combination, acids having ionization constants at 25° C. in the range $2.25 \times 10^{-3}$ to $6 \times 10^{-7}$, for example inorganic acids, e. g., hydrazoic acid; organo-inorganic acids, e. g., methaneselenic acid ($CH_3SeO_2H$); aromatic acids, e. g., benzoic acid, $\Delta^2$-dihydro-beta-naphthoic acid, m-cyanobenzoic acid, and p-dimethylaminobenzoic acid; saturated aliphatic acids, e. g., formic acid, gamma-bromobutyric acid, acetoacetic acid, and propionic acid; unsaturated aliphatic acids, e. g., crotonic acid and acrylic acid; aliphatic acids with aromatic or heterocyclic substituents, e. g., benzilic acid, phenoxyacetic acid, phenylmercaptoacetic acid, 3-indoleacetic acid, and hippuric acid; cycloaliphatic acids, e. g., hexahydrobenzoic acid; dibasic acids, e. g. camphoric acid, 1,1-cyclohexanediacetic acid, suberic acid, pimelic acid, o-phthalic acid, and succinic acid.

Preferred for reasons of commercial availability are acids having an acid group wherein the acid hydrogen is bonded through oxygen to a polyvalent atom which is further bonded to oxygen.

Acids of ionization constant greater than $2.25 \times 10^{-3}$ are not only inoperative as initiators but, surprisingly, even act as inhibitors of the polymerization and actually stabilize the N-carboanhydrides. Acids of ionization constant less than $6 \times 10^{-7}$ are virtually ineffective as polymerization initiators. These facts are illustrated by Examples A to F below.

Example A

To a solution of 3 parts of the N-carboanhydride of 2-amino-4,6,6-trimethylheptanoic acid in 223.35 parts of chloroform was added 1.489 parts of a chloroform solution containing 0.006 part (1.17 mole per cent based on N-carboanhydride) of anhydrous hydrogen chloride. After standing for one day in a closed container at room temperature, no pressure was noted when the system was opened to the atmosphere. A thin layer of this solution was poured on a glass plate and the solvent evaporated. Crystals of the starting N-carboanhydride were obtained.

A similar solution of another sample from the same batch of N-carboanhydride containing no added hydrogen chloride likewise gave the same results after standing for one day in a closed vessel at room temperature.

Thus, no initiation of polymerization was evidenced with the added hydrogen chloride. The ionization constant of hydrochloric acid is variously given, but no lower than $1 \times 10^5$ to $1 \times 10^7$ as given at page 402 of Getman and Daniels, 5th edition (Wiley, New York, 1931).

Example B

To a solution of 3 parts of the N-carboanhydride of 2-amino-4,6,6-trimethylheptanoic acid in 223.35 parts of chloroform was added 0.025 part (1.09 mole per cent based on N-carboanhydride) of trichloroacetic acid—whose ionization constant, $K_1$, is equal to $1.3 \times 10^{-1}$ at 25° C. After standing for one day in a closed container at room temperature, no pressure was noted when the system was opened to the atmosphere. A thin layer of the solution was poured onto a glass plate and the solvent evaporated. There was obtained scattered fragments of film, interspersed with a majority of the crystalline starting N-carboanhydride.

A similar solution of another sample from the same batch of N-carboanhydride containing no added trichloroacetic acid likewise gave the same results after standing for one day in a closed vessel at room temperature. Thus, no initiation of polymerization over the control was evidenced with the added trichloroacetic acid.

Example C

To a solution of one part of the N-carboanhydride of 2-amino-4,6,6-trimethylheptanoic acid in 74.45 parts of chloroform was added 5.21 parts of a chloroform solution containing 0.0055 part (0.91 mole per cent based on N-carboanhydride) of dichloroacetic acid—whose ionization constant, $K_1$, at 25° C. is equal to $5 \times 10^{-2}$. After standing for one day in a closed container at room temperature, no pressure was noted when the system was opened to the atmosphere. A thin layer of the solution was poured on a glass plate and the solvent evaporated. There was obtained a crystalline solid which melted quickly and sharply, with decomposition, at the same point as the starting N-carboanhydride.

A similar solution of another sample from the same batch of N-carboanhydride without added dichloroacetic acid gave the same result as the solution containing the dichloroacetic acid after standing for one day in a closed vessel at room temperature. Thus, no initiation of polymerization was evidenced with the added dichloroacetic acid.

Example D

A mixture of 2 parts of the N-carboanhydride of 1-amino-cyclohexanecarboxylic acid and 0.0155 part (1.0 mole per cent based on N-carboanhydride) of dichloroacetic acid in 0.708 part of anhydrous diethyl ether in a glass polymerization tube was evacuated to remove the ether and then heated at atmospheric pressure under nitrogen at 146° C. The N-carboanhydride melted and remained clear for 33 minutes, at which point a slight haze became evident, but no evolution of carbon dioxide occurred. The fluid melt did not become opaque until after eighty-eight minutes.

Another sample from the same batch of N-carboanhydride without the added dichloroacetic acid under like conditions became cloudy after five minutes, almost opaque after eight minutes, and showed signs of thickening after eighty minutes. Inhibition of polymerization rather than initiation was thus evidenced with the added dichloroacetic acid.

Example E

To a solution of 3 parts of the N-carboanhydride of 2-amino-4,6,6-trimethylheptanoic acid in 223.35 parts of chloroform was added 0.032 part (1.20 mole per cent based on N-carboanhydride) of p-toluenesulfonic acid monohydrate, whose ionization constant, $K_1$ at 25° C.$=3.24 \times 10^{-3}$, as determined experimentally. After standing for one day in a closed container at room temperature, slight pressure was noted when the system was opened to the atmosphere. A thin layer of the solution was poured on a glass plate and the solvent evaporated. There were obtained scattered fragments of film interspersed with a majority of the crystalline starting N-carboanhydride.

A similar solution of another sample from the same batch of N-carboanhydride containing no added p-toluene-sulfonic acid monohydrate gave similar results after standing for one day in a closed vessel at room temperature. Thus, there was no initiation of polymerization action over the control observed through the addition of p-toluenesulfonic acid monohydrate.

*Example F*

A mixture of two parts of the N-carboanhydride of 1-aminocyclohexanecarboxylic acid and 0.0074 part (one mole per cent based on the N-carboanhydride) of boric acid, whose ionization constant $K_1 = 5.8 \times 10^{-10}$ at 25° C., was heated at atmospheric pressure under nitrogen at 146° C. The N-carboanhydride melted at once and remained clear and liquid for seventy-nine minutes. At this point a slight haziness was observed, and after a total time of eighty-eight minutes the fluid melt became opaque. No thickening of the melt or evolution of carbon dioxide was observed within two hours' heating time.

Another sample from the same batch of N-carboanhydride, without the added boric acid, under like conditions became cloudy after five minutes, almost opaque after eight minutes, and showed signs of thickening after eighty minutes. Inhibition of polymerization rather than initiation was thus evidenced in the case of the added boric acid.

In order to obtain linear polyamides, acids having not more than two acidic hydrogen-bearing groups are used. These acids are preferred for this reason to trimesic acid and other polyacids of more than two acidic hydrogen-bearing groups.

The acid initiators of this invention have ionization constants in the range $2.25 \times 10^{-3}$ to $6 \times 10^{-7}$; however, I have observed that phenols, although having ionization constants outside the range of the acid initiators of this invention, are also operable as initiators.

As may be seen from the examples, the acids of this invention not only serve as initiators for the condensation polymerization, with carbon dioxide evolution, in soltuion of the N-carboanhydrides of amino acids, but also serve as initiators in thermal bulk polymerization. The length of heating cycle necessary for the production of linear polyamides from the N-carboanhydrides of amino acids by thermal bulk polymerization is also markedly decreased when the condensation polymerization is carried out in the presence of small proportions of these acids.

The acid initiators of this invention are operable in the presence of water. Despite the presence of relatively large proportions of water, the small proportion of the acid initiators of this invention produces high-molecular-weight, soluble polymers in a much shorter time than those systems without the added acid initiators.

The condensation polymerization, with carbon dioxide evolution, of the N-carboanhydrides of alpha- and beta-amino acids may be carried out by the process of this invention in bulk and in solution at temperatures from below, to those above, the decomposition point of the N-carboanhydrides but below the decomposition point of the resulting polyamide. Preferred for reasons of decreased decomposition of the resulting polyamide are temperatures in the range 20–200° C. Especially preferred, because of the high molecular weight of the resulting polyamides produced in a shorter time, are those temperatures in the range 30° C. below, and 30° C. above, the melting point of the lowest-melting N-carboanhydride involved. To decrease the amount of discoloration in the resulting polyamide, it is preferred to carry out the condensation polymerization in an inert atmosphere, such as nitrogen.

As solvents for the solution polymerization of N-carboanhydrides, singly or in mixture, there may be used any substance which dissolves the N-carboanhydride or N-carboanhydrides being used at the temperature of polymerization, and which is chemically inert toward the N-carboanhydride and the polymer derived therefrom. Suitable examples, taken singly or in mixtures, are aromatic solvents such as benzene, toluene, and xylene; halogenated hydrocarbons, e. g., chloroform, methylene chloride, carbon tetrachloride, chlorobenzene, and trichloroethylene; aliphatic cyclic ketones, e. g., cyclohexanone, cyclopentanone, and 4-methylcyclohexanone; aliphatic-aromatic hydrocarbons, e. g., tetrahydronaphthalene.

The N-carboanhydrides whose condensation polymerization, singly or in mixtures, with evolution of carbon dioxide, may be initiated by the acids of this invention are those obtainable from amino acids of radical lengths 3 or 4, i. e., alpha- or beta-amino acids. Preferred for reasons of thermal stability of the resultant polyamides are those N-carboanhydrides which may be obtained from amino acids of radical lengths 3 or 4 containing at most one hydrogen atom or the alpha-carbon atom. Particularly preferred for reasons of ease of preparation are the N-carboanhydrides obtainable from amino acids of radical length 3, i. e., alpha-amino acids, containing at most one hydrogen on the alpha carbon. By the term "radical length" is meant the total number of atoms in the amino acid chain between and inclusive of the amino nitrogen and the acyl carbon atoms. By "alpha-carbon atom" is meant, of course, the carbon atom bearing the acyl carbon atom.

Specific examples of the N-carboanhydrides whose condensation polymerization, singly or in mixtures, with evolution of carbon dioxide, may be initiated by the acids of this invention include, in addition to those given in the examples, those of alpha-amino acids or their suitably protected derivatives such as valine, alanine, norleucine, isoleucine, tryptophane, methionine, tyrosine, cystine, lysine, sarcosine, histidine, pipecolic acid, glutamic acid, 1-amino-3,3,5-trimethylcyclohexanecarboxylic acid, 2-cyclohexylglycine, N-phenylglycine, 1-amino-2-methylcyclobutanecarboxylic acid, 4-amino-1-methylpiperidine-4-carboxylic acid, 3-aminotetrahydrothiophene-3-carboxylic acid, 1-amino-cyclopentanecarboxylic acid, and 1-aminocycloheptanecarboxylic acid; and those of beta-amino acids such as aminopivalic acid, beta-phenyl-beta-aminopropionic acid and beta-aminobutyric acid.

In the region of 0.5 to 1.2 mole per cent of acid initiator of this invention a change in quantity of acid initiator of higher ionization contact, e. g., p-nitrobenzoic, has a greater effect on molecular weight and film and fiber properties than does the same mole percentage change with an acid initiator of lower ionization constant, e. g., stearic acid or acetic acid.

Use of higher amounts of acids, i. e., greater than 1.2 mole per cent, is not only unnecessary to achieve the desired initiation of the reaction but tends to give undesirable by-products or polymers of inferior quality and if molar quantities of acids are used simultaneous acylation and ring opening of the N-carboanhydride occur giving monomeric products mixed with very low molecular weight polymers.

When the ratio of acid initiator to N-carboanhydride is greater than 1.2 mole per cent (based on the total N-carboanhydrides involved) the polyamides obtained are too low in molecular weight to give tough and useful products. However, if this ratio is from 1.2:1.00 to 0.00075:100 (i. e., 1.2 to 0.00075 mole per cent acid initiator of this invention, based on the total N-carboanhydrides involved), the polyamides obtained are of high molecular weight, give tough and highly useful products, and are capable of being shaped into useful articles; e. g., they can be converted into films and fibers. Values of from 0.5:100 to 0.00075:100 for this ratio (i. e., 0.5 to 0.00075 mole per cent of the acid initiators of this invention, based on the total N-carboanhydrides involved) are preferred since the polyamides are of high enough molecular weight to give tough and useful products, while the time necessary for complete polymerization is markedly decreased.

The ionization constants determined experimentally were determined by the method of potentiometric titration given on pages 745–747 of Reilly and Rae, "Physico-Chemical Methods" (Van Nostrand, 1933). The other ionization constants given, unless otherwise noted, were obtained from "Handbook of Chemistry," 6th Ed., by Lange (Handbook Publishers, Inc., 1946), pages 1377–1381.

The foregoing detailed description has been given for clearness of understanding only, and no unnecessary limitations are to be understood therefrom. The invention is not limited to the exact details shown and described, for obvious modifications will occur to those skilled in the art.

What is claimed is:

1. In a process for the preparation of linear polymers of amino acids of radical length of three to four wherein the N-carboanhydride of said acid is polymerized, with carbon dioxide evolution, the improvement which comprises bringing said carboanhydride in contact with, as an initiator of the condensation polymerization, from 1.2 to 0.00075 mole per cent, based on the N-carboanhydride, of an acid of ionization constant in the range from $2.25 \times 10^{-3}$ to $6 \times 10^{-7}$.

2. Process of claim 1 wherein a plurality of N-carboanhydrides are used.

3. In a process for the preparation of linear polymers of alpha amino acids wherein the N-carboanhydride of at least one such acid is polymerized, with carbon dioxide evolution, the improvement which comprises bringing said carboanhydride in contact with, as an initiator of the condensation polymerization, from 1.2 to 0.00075 mole per cent, based on the N-carboanhydride, of an acid of ionization constant in the range from $2.25 \times 10^{-3}$ to $6 \times 10^{-7}$.

4. Process of claim 3 wherein the acid initiator is an organic acid.

5. Process of claim 4 wherein the acid initiator is an organic carboxylic acid.

6. Process of claim 4 wherein the acid initiator is an organic carboxylic acid of from one to two carboxyls.

7. A process for the preparation of linear polymers of amino acids which are of radical length of three to four and are, apart from the amino and carboxyl groups, saturated hydrocarbon wherein the N-carboanhydride of said acid is polymerized, with carbon dioxide evolution, by bringing the same in contact with, as an initiator of the condensation polymerization, from 1.2 to 0.00075 mole per cent, based on the N-carboanhydride, of an acid of ionization constant in the range from $2.25 \times 10^{-3}$ to $6 \times 10^{-7}$.

ROBERT NEAL MacDONALD.

No references cited.